US006983348B2

(12) United States Patent
Jamil et al.

(10) Patent No.: US 6,983,348 B2
(45) Date of Patent: Jan. 3, 2006

(54) METHODS AND APPARATUS FOR CACHE INTERVENTION

(75) Inventors: Sujat Jamil, Chandler, AZ (US); Hang Nguyen, Tempe, AZ (US); Samantha J. Edirisooriya, Tempe, AZ (US); David E. Miner, Chandler, AZ (US); R. Frank O'Bleness, Tempe, AZ (US); Steven J. Tu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/303,931

(22) Filed: Nov. 25, 2002

(65) Prior Publication Data

US 2003/0154352 A1 Aug. 14, 2003

Related U.S. Application Data

(63) Continuation-in-part of application No. 10/073,492, filed on Feb. 11, 2002, which is a continuation-in-part of application No. 10/057,493, filed on Jan. 24, 2002, now Pat. No. 6,775,748.

(51) Int. Cl.
*G06F 12/00* (2006.01)

(52) U.S. Cl. ....................... 711/146; 711/142; 711/143; 711/145

(58) Field of Classification Search ................ 711/141, 711/144, 145, 146, 143, 142
See application file for complete search history.

(56) References Cited

U.S. PATENT DOCUMENTS 5,369,753 A * 11/1994 Tipley ........................ 711/122
5,664,150 A 9/1997 Isaac et al.
5,765,199 A 6/1998 Chang et al.
5,802,577 A 9/1998 Bhat et al.
5,867,162 A 2/1999 O'Leary et al.
5,913,226 A 6/1999 Sato
5,943,684 A * 8/1999 Arimilli et al. ............. 711/144
5,996,049 A 11/1999 Arimilli et al. ............. 711/141
6,073,211 A * 6/2000 Cheng et al. ............... 711/122
6,170,040 B1 * 1/2001 Lee et al. ................... 711/143
6,266,744 B1 7/2001 Hughes et al.
6,321,297 B1 * 11/2001 Shamanna et al. .......... 711/122
6,345,340 B1 * 2/2002 Arimilli et al. ............. 711/141
6,360,301 B1 * 3/2002 Gaither et al. .............. 711/143
6,378,048 B1 * 4/2002 Prudvi et al. ............... 711/144
6,425,060 B1 7/2002 Mounes-Toussi et al.
6,438,660 B1 8/2002 Reams
6,519,685 B1 2/2003 Chang
6,549,989 B1 * 4/2003 Arimilli et al. ............. 711/144
6,549,990 B2 4/2003 Hughes et al.
6,574,710 B1 * 6/2003 Gaither et al. .............. 711/122
6,615,322 B2 9/2003 Arimilli et al.
6,615,323 B1 9/2003 Petersen et al.
6,629,212 B1 * 9/2003 Arimilli et al. ............. 711/144
6,694,409 B2 2/2004 Chang
6,775,748 B2 8/2004 Jamil et al.

(Continued)

OTHER PUBLICATIONS

Handy, "The Cache Memory Book", © 1998, Academic Press, Inc., p. 126-127, 156-186.*

(Continued)

*Primary Examiner*—Brian R. Peugh
(74) *Attorney, Agent, or Firm*—Hanley, Flight & Zimmerman, LLC

(57) ABSTRACT

Methods and Apparatus for cache-to-cache transfers upon snooping a cache interconnect to detect a memory read request associated with a cache memory block cached in a first cache and a second cache. Upon a cache hit to a first and a second cache, supplying the cached memory block from the first cache or the second cache to a third cache based on a predetermined arbitration hierarchy.

24 Claims, 5 Drawing Sheets

U.S. PATENT DOCUMENTS

| | | | | |
|---|---|---|---|---|
| 6,785,774 | B2 * | 8/2004 | Arimilli et al. | 711/141 |
| 6,834,327 | B2 * | 12/2004 | Lyon | 711/122 |
| 2003/0154352 | A1 * | 8/2003 | Jamil et al. | 711/146 |

OTHER PUBLICATIONS

Tomasevic, M; Milutinovic, V. "Hardware Approaches to Cache Coherence in Shared-Memory Multiprocessors, Part 1." IEEE Micro. vol. 14, Issue 5, pp 52-59. Oct. 1994.

Tomasevic, M; Milutinovic, V. "Hardware Approaches to Cache Coherence in Shared-Memory Multiprocessors, Part 2." IEEE Micro. vol. 14, Issue 6, pp 61-66. Dec. 1994.

"Intel® Itanium™ Processor Hardware Developer's Manual." ftp://download.intel.com/design/Itanium/Downloads/24870102.pdf. Document No.: 248701-002. Aug. 2001.

"Intel® Itanium™ 2 Processor Hardware Developer's Manual." ftp://download.intel.com/design/Itanium2/manuals/25110901.pdf. Document No.: 251109-001. Jul. 2002.

"Intel® Pentium® 4 Processor with 512-KB L2 Cache on 0.13 Micron Process Datasheet." ftp://download.intel.com/design/Pentium4/datashts/29864309.pdf. Document No.: 298643-009. May 2003.

Lee, *A Secondary Cache Controller Design for a High-End Microprocessor*, Institute of Electrical and Electronics Engineers, Inc., pp. 1141-1146 (© 1992).

* cited by examiner

RH - Read Hit
RMS - Read Miss, Shared
RME - Read Miss, Exclusive
WH - Write Hit
WM - Write Miss - Invalidate
SHR - Snoop Hit on Read
SHRBO - Snoop Hit on a Read with Back Off
SHRNBO - Snoop Hit on a Read with no Back Off
SHW - Snoop Hit on a Write or Read with Intent to Modify (I) - Invalidate
(R) - Cache Line Fill
(S) - Snoop Push
(RM) - Read with Intent to Modify

METHODS AND APPARATUS FOR CACHE INTERVENTION

RELATED APPLICATIONS

This patent arises from a continuation-in-pun of U.S. patent application Ser. No. 10/073,492, filed Feb. 11, 2002, which, in turn, is a continuation-in-part of U.S. patent application Ser. No. 10/057,493, which was filed on Jan. 24, 2002, and which has issued as U.S. Pat. No. 6,775,748.

TECHNICAL FIELD

The present invention relates in general to cache memory and, in particular, to methods and apparatus for cache intervention.

BACKGROUND

In an effort to increase computational power, many computing systems are turning to multi-processor systems. A multi-processor system typically includes a plurality of microprocessors, a plurality of associated caches, and a main memory. In an effort to reduce bus traffic to the main memory, many multi-processor systems use a "write-back" (as opposed to a "write-through") policy. A "write-back" policy is a cache procedure whereby a microprocessor may locally modify data in its cache without updating the main memory until the cache data needs to be replaced. In order to maintain cache coherency in such a system, a cache coherency protocol may be used.

One problem with a "write-back" policy is sourcing a read request from one cache when another cache is holding the requested memory block in a modified state (i.e., the data is "dirty"). If the requesting cache is allowed to read the data from main memory, the value of the data will be incorrect. In order to solve this problem, some protocols abort the read operation, require the cache with the "dirty" data to update the main memory, and then allow the requesting cache to "retry" the read operation. However, this process adds latency to the read operation and increases bus traffic to the main memory. In an effort to further reduce bus traffic to the main memory, other protocols allow a first cache that is holding locally modified data (i.e., "dirty" data) to directly supply a second cache that is requesting the same block, without updating main memory.

DETAILED DESCRIPTION OF EXAMPLES

In general, the methods and apparatus described herein provide for cache-to-cache block transfers from a first cache to a second cache (i.e., cache intervention) when the state of the transferred block is in a non-modified state (e.g., "exclusive" or "shared"). In a first example, the first cache holds the memory block in an "exclusive" state prior to the block transfer, and the second cache does not hold the memory block. When a processor associated with the second cache attempts to read the block from a main memory, the first cache intervenes and supplies the block instead of main memory supplying the block. The memory block in the second cache is stored in a "shared" state. In addition, the state of the memory block in the first cache changes from "exclusive" to "shared." In a second example, a processor associated with a third cache attempts to read the block from the main memory while the first cache and the second both hold the memory block in the "shared" state. Either the first cache or the second cache is determined to be an arbitration winner, and the arbitration winner intervenes and supplies the block. In both examples, communications with main memory and power consumption are reduced.

In one example, a first cache holds the memory block prior to the transfer. When a processor associated with a second cache attempts to read the block from a main memory, the first cache intervenes and supplies the block to the second cache regardless of the state (modified or non-modified) of the cached block. In addition, an agent associated with the first cache asserts a "hit" signal line regardless of the state (modified or non-modified) of the cached block. The agent associated with the first cache does not assert a "hit-modified" signal line.

Figure 1:
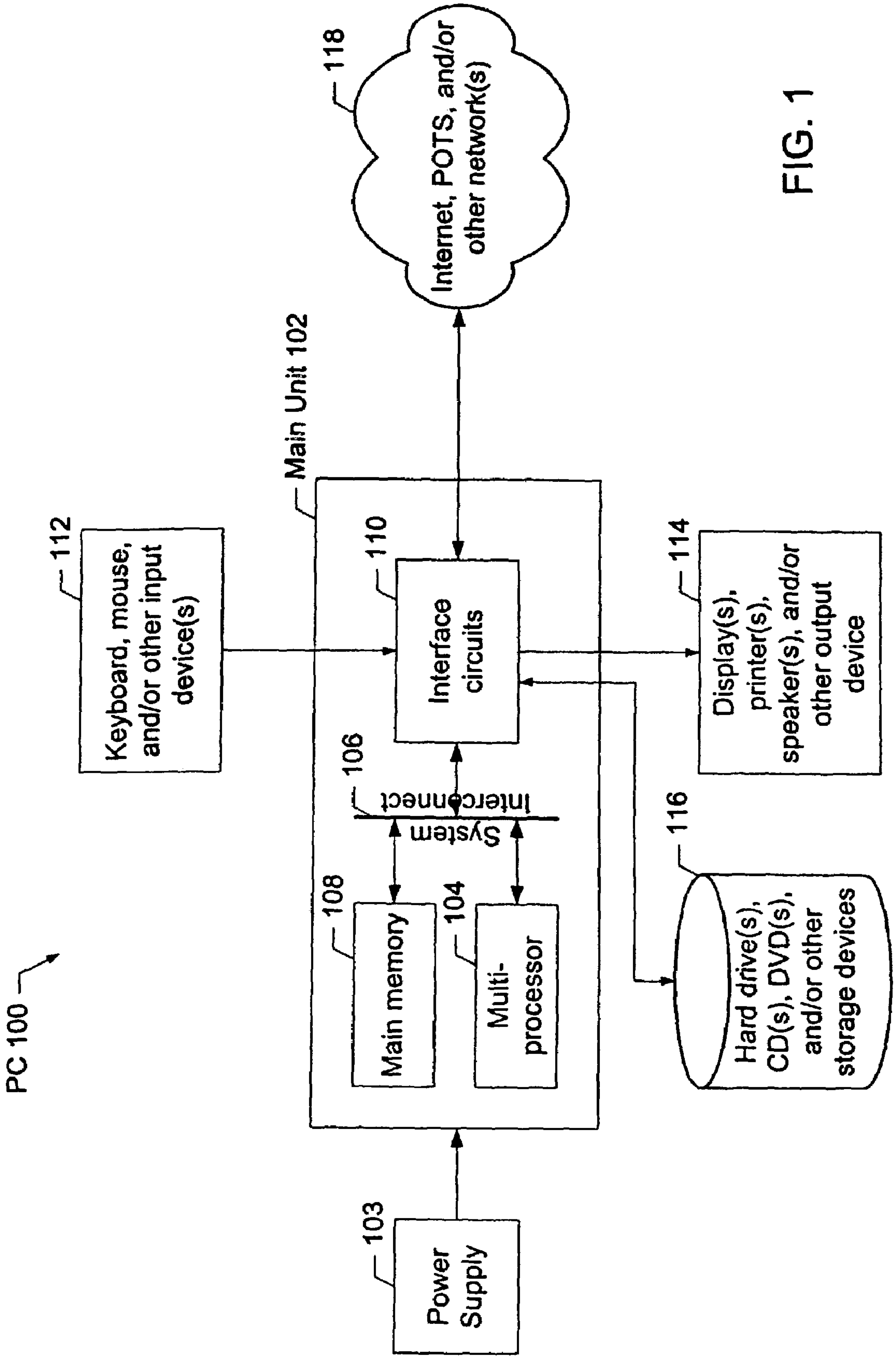
FIG. 1 is a high level block diagram of a computer system illustrating an environment of use for the present invention.

A block diagram of a computer system 100 is illustrated in FIG. 1. The computer system 100 may be a personal computer (PC), a personal digital assistant (PDA), an Internet appliance, a cellular telephone, or any other computing device. For one example, the computer system 100 includes a main processing unit 102 powered by a power supply 103. The main processing unit 102 may include a multi-processor unit 104 electrically coupled by a system interconnect 106 to a main memory device 108 and one or more interface circuits 110. For one example, the system interconnect 106 is an address/data bus. Of course, a person of ordinary skill in the art will readily appreciate that interconnects other than busses may be used to connect the multi-processor unit 104 to the main memory device 108. For example, one or more dedicated lines and/or a crossbar may be used to connect the multi-processor unit 104 to the main memory device 108.

The multi-processor 104 may include any type of well known central processing unit (CPU), such as a CPU from the Intel Pentium™ family of microprocessors, the Intel Itanium™ family of microprocessors, and/or the Intel XScale™ family of processors. In addition, the multi-processor 104 may include any type of well known cache memory, such as static random access memory (SRAM). The main memory device 108 may include dynamic random access memory (DRAM) and/or non-volatile memory. For one example, the main memory device 108 stores a software program which is executed by the multi-processor 104 in a well known manner.

The interface circuit(s) 110 may be implemented using any type of well known interface standard, such as an Ethernet interface and/or a Universal Serial Bus (USB) interface. One or more input devices 112 may be connected to the interface circuits 110 for entering data and commands into the main processing unit 102. For example, an input device 112 may be a keyboard, mouse, touch screen, track pad, track ball, isopoint, and/or a voice recognition system.

One or more displays, printers, speakers, and/or other output devices 114 may also be connected to the main processing unit 102 via one or more of the interface circuits 110. The display 114 may be cathode ray tube (CRTs), liquid crystal displays (LCDs), or any other type of display. The display 114 may generate visual indications of data generated during operation of the main processing unit 102. The visual displays may include prompts for human operator input, calculated values, detected data, etc.

The computer system 100 may also include one or more storage devices 116. For example, the computer system 100 may include one or more hard drives, a compact disk (CD) drive, a digital versatile disk drive (DVD), and/or other computer media input/output (I/O) devices.

The computer system 100 may also exchange data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
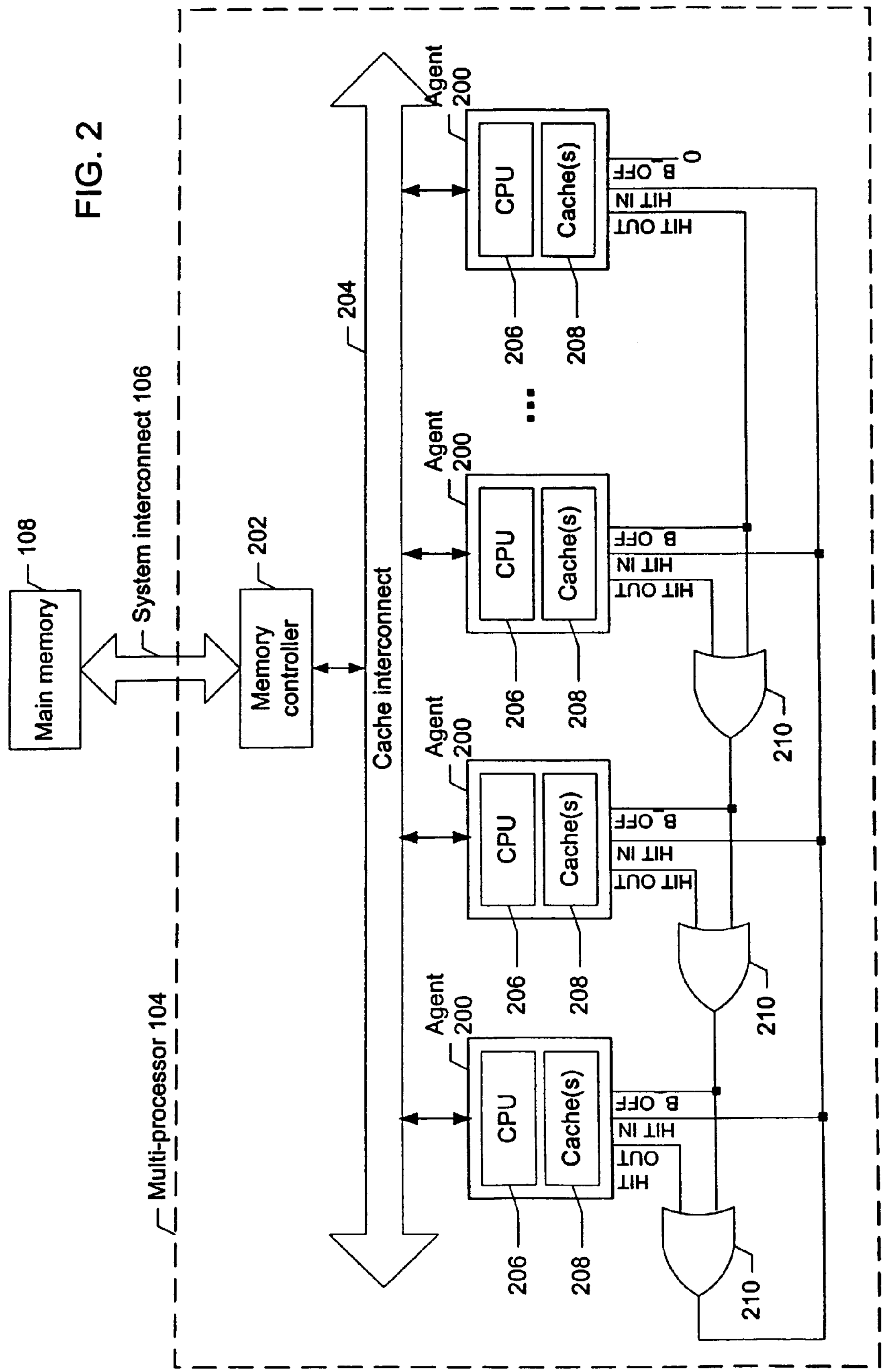
FIG. 2 is a more detailed block diagram of the multi-processor illustrated in FIG. 1.

A more detailed block diagram of the multi-processor unit 104 is illustrated in FIG. 2. Although certain signal names are used to describe this example, a person of ordinary skill in the art will readily appreciate that the name of each of the signal lines described herein is irrelevant to the operation of the signal line. Similarly, although certain connection schemes and logic gates are used to describe this example, a person of ordinary skill in the art will readily appreciate that many other connection schemes and/or logic gates may be used.

In the example illustrated in FIG. 2, the multi-processor 104 includes a plurality of processing agents 200 and a memory controller 202 electrically coupled by a cache interconnect 204. The cache interconnect 204 may be any type of interconnect such as a bus, one or more dedicated lines, and/or a crossbar. Each of the components of the multi-processor 104 may be on the same chip or on separate chips. For one example, the main memory 108 resides on a separate chip. Due to the memory controller 202, one processing agent 200 may communicate with another processing agent 200 via the cache interconnect 204 without the communication necessarily generating activity on the system interconnect 106. Typically, if activity on the system interconnect 106 is reduced, overall power consumption is reduced. This is especially true in an example where the main memory 108 resides on a separate chip from the processing agents 200.

Each processing agent 200 may include a central processing unit (CPU) 206 and one or more cache(s) 208. As discussed above, each CPU 206 may be any type of well known processor such as an Intel Pentium™ processor. Similarly, each cache may be constructed using any type of well known memory, such as SRAM. In addition, each processing agent 200 may include more than one cache. For example, a processing agent may include a level 1 cache and a level 2 cache. Similarly, a processing agent may include an instruction cache and/or a data cache.

Each processing agent 200 may include at least one signal input and at least one signal output. For one example, a "hit out" signal output is asserted when an agent 200 detects activity on the cache interconnect 204 associated with a memory location for which the agent 200 is currently holding a copy in its cache 208. For one example, each agent "snoops" address lines on a cache interconnect bus and asserts "hit out" each time it sees an address associated with a memory block in its cache. For example, if a second agent initiates a read request, and a first agent holds a copy of the same memory block in its cache, the first agent may assert its "hit out" line.

For one example, one or more of these "hit out" lines are connected to a "hit in" line on each processing agent 200. For one example, all of the "hit out" lines are logically ORed together, by one or more OR gates 210, and the output of the OR gate(s) 210 is connected to each of the "hit in" lines as shown in FIG. 2. In this manner, an active processing agent 200 knows when the cache 208 of another processing agent 200 holds a memory block associated with an activity the active processing agent 200 is performing. However, the active processing agent 200 does not necessarily know which cache 208 holds the memory block. Each processing agent 200 may be structured to use this "hit in" line to initiate and/or cancel any activity the processing agent 200 is capable of performing. For example, an asserted "hit in" line may serve to cancel a read from main memory.

In addition, one or more of the "hit out" lines may be connected to a "back-off" input on each processing agent 200. For one example, a first processing agent 200 optionally includes a "back-off" input which is never asserted (e.g., the input is connected to logic zero). This processing agent 200 has the highest priority in an arbitration scheme described in detail below (i.e., no other agent ever tells this agent to "back-off"). A second processing agent 200 may include a "back-off" input which is connected only to the "hit out" of the first processing agent. This processing agent has the second highest priority (i.e., only the highest priority agent can tell this agent to "back-off"). If included in the system, a third processing agent 200 may include a "back-off" input which is connected to the output of a first OR gate 210. The inputs of the first OR gate 210 are in turn connected to the "hit out" signals of the first processing agent 200 and the second processing agent 200. This processing agent has the third highest priority (i.e., either of the highest priority agent and the second highest priority agent can tell this agent to "back-off"). If included in the system, a fourth processing agent 200 may include a "back-off" input which is connected to the output of a second OR gate 210. The inputs of the second OR gate 210 are in turn connected to the "hit out" signal of the third processing agent 200 and the output of the first OR gate 210. This processing agent 200 has the fourth highest priority (i.e., any of the first three agents can tell this agent to "back-off"). This pattern may continue for any number of processing agents 200 as shown in FIG. 2.

Figure 3:
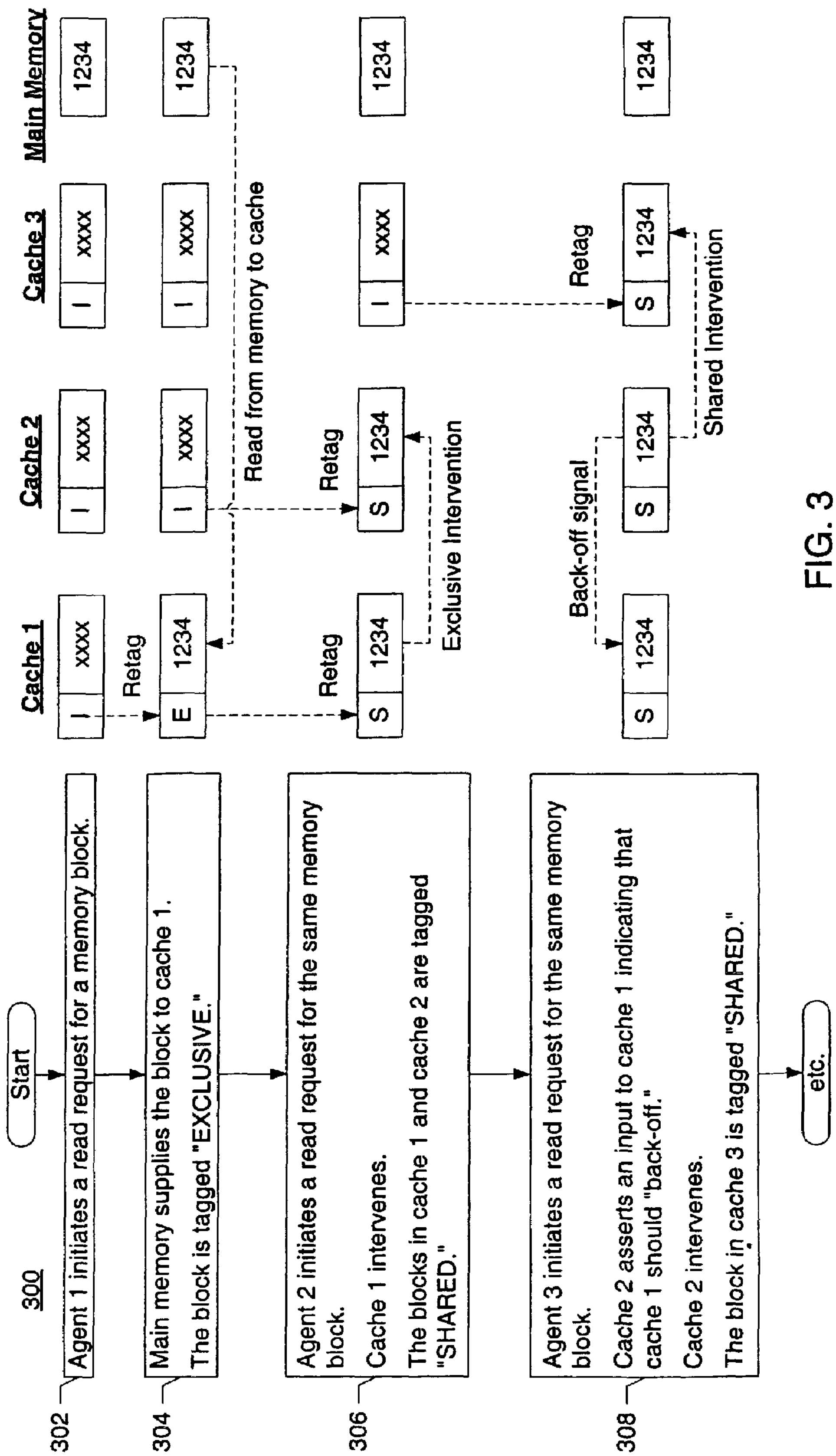
FIG. 3 is a flowchart of a process for cache intervention in a multi-processor system.

A flowchart of a process 300 for cache intervention is illustrated in FIG. 3. Adjacent each operation in the illustrated process 300 is a block diagram illustrating example actions taken by each of a first cache 208, a second cache 208, a third cache 208, and a main memory 108 during the associated operation. For simplicity in description, only one short memory block is illustrated for each of the first cache 208, the second cache 208, the third cache 208, and the main memory 108. Although the process 300 is described with reference to the flowchart illustrated in FIG. 3, a person of ordinary skill in the art will readily appreciate that many other methods of performing the acts associated with process 300 may be used. For example, the order of some of the operations may be changed. In addition, many of the operations described are optional, and many additional operations may occur between the operations illustrated.

For one example, a "write-back" (as opposed to a "write-through") or other policy is used. A "write-back" policy is a cache procedure whereby a cache agent 200 may locally modify data in its cache 208 without updating main memory 108 until the cache block needs to be replaced. In order to maintain cache coherency in such a system, a cache coherency protocol may be used.

In one example, a MESI (i.e., modified, exclusive, shared, invalid) cache coherency protocol is followed. However, a person of ordinary skill in the art will readily appreciate that any cache coherency protocol which includes the equivalent of a "non-modified" state, an "exclusive" state, and/or a "shared" state may be used. For example, a MOESI, ESI, Berkeley, or Illinois cache coherency protocol may be used. In the well known MESI cache coherency protocol, an "invalid" block is a block that does not contain useful data (i.e., the block is effectively empty). An "exclusive" block is a block that is "non-modified" (i.e., the same as main memory) and only held by one cache 208 (e.g., the block was just read in from main memory for the first time). A "modified" block is a block that is "dirty" (i.e., different from main memory) and only held by one cache 208 (e.g., a new value was written to the cache copy, but not to main memory's copy). A "shared" block is a block that is held by more than one cache 208. If a MOESI type protocol is used, an "owned" state is added. An "owned block is a block that is "modified" and "shared" (i.e., "dirty" and held by another cache). The "owner" of a block is responsible for eventually updating main memory 108 with the modified value (i.e., the "owner" is responsible for performing the write-back).

In one example, the state of a cached memory block is recorded in a cache directory. In another example, the state of a cached memory block is recorded in a tag associated with the cached memory block. In the MOESI cache coherency protocol there are five possible states. Accordingly, each state may be represented by a different digital combination (e.g., 000= Modified, 001=Owned, 010=Exclusive, 011=Shared, 100=Invalid). Retagging a cached memory block is the act of changing the state of the cached memory block. For example, retagging a block from "exclusive" to "shared" may be accomplished by changing a tag associated with the block from "010" to "011." Of course, a person of ordinary skill in the art will readily appreciate that any method of storing and changing a cache block state may be used.

Generally, process 300 illustrates an example "exclusive" cache intervention and an example "shared" cache intervention. In the "exclusive" cache intervention example, the first cache holds a memory block in an "exclusive" state prior to a block transfer, and a second cache does not hold the memory block. When a processor associated with the second cache attempts to read the block from a main memory, the first cache intervenes and supplies the block instead of main memory supplying the block. For one example, the memory block in the second cache is stored in a "shared" state. In addition, the state of the memory block in the first cache may change from "exclusive" to "shared."

In the "shared" cache intervention example, a processor associated with a third cache attempts to read the block from the main memory while the first cache and the second both hold the memory block in the "shared" state. Either the first cache or the second cache is determined to be an arbitration winner, and the arbitration winner intervenes and supplies the block. Of course, any number of caches may be used with any type of arbitration scheme. In both examples, communications with main memory and power consumption are reduced.

The process 300 begins when a first processing agent 200 initiates a read request for a particular memory block (operation 302). In this example, the first cache 208 includes a position that is tagged "invalid." Of course, a person of ordinary skill in the art will readily appreciate that a cache position need not be tagged invalid to be over-written, and many well known cache replacement protocols, such as least recently used (LRU), may be used to determine which cache position is to be over-written.

No other cache 208 currently holds the requested memory block (e.g., no "hit" is generated or a cache directory indicates that no other caches holds the requested block), so main memory 108 supplies the requested block (operation 304). This action requires the memory controller 202 to access the main memory 108 via the system interconnect 106. The cached block may be tagged "exclusive" to indicate that no other cache 208 currently holds this block (operation 304).

If the second processing agent 200 initiates a read request for the same memory block, the first cache 208 detects a "hit" (e.g., by snooping the address bus shared by the first and second agents or using a cache directory) (operation 306). Because the first cache 208 is holding the block in the "exclusive" state (i.e., the block in the first cache is the same as the block in main memory), main memory 108 could be allowed to supply the block, as requested by the second processing agent 200. However, the first cache 208 may intervene and supply the block via the cache interconnect 204 in order to reduce traffic on the system interconnect 106 (operation 306). The memory blocks in both the first cache 208 and the second cache 208 may be tagged "shared" to indicate that another cache 208 also holds this memory block (operation 306). If either cache 208 writes to this block, the other cache 208 needs to be updated or invalidated. Significantly, in operation 306, a first processing agent 200 intervenes to supply a block held in an "exclusive" state to a second processing agent 200.

If the third processing agent 200 also initiates a read request for the same memory block, the first and second caches 208 both detect a "hit" (e.g., by snooping the address bus or via a cache directory) (operation 308). As a result, the second cache 208 may assert the "back-off" input of the first cache (operation 308). Because the first cache 208 and the second cache 208 are both holding the block in the "shared" state (i.e., the cache blocks are the same as the block in main memory), main memory 108 could be allowed to supply the block, as requested by the third processing agent 200. However, the second cache 208 may intervene and supply the block via the cache interconnect 204 in order to reduce traffic on the system interconnect 106 (operation 308). The first cache 208 knows to let another cache 208 (i.e., the second cache) supply the block because the "back-off" input of the first cache is asserted. The memory block in the third cache 208 may be tagged "shared" to indicate that another cache 208 also holds this memory block (operation 308). Significantly, in operation 308, one processing agent 200 intervenes to supply a block held in a "shared" state to another processing agent 200, and the intervening agent 200 also asserts a signal to suppress yet another agent 200 from supplying the same block.

Figure 4:
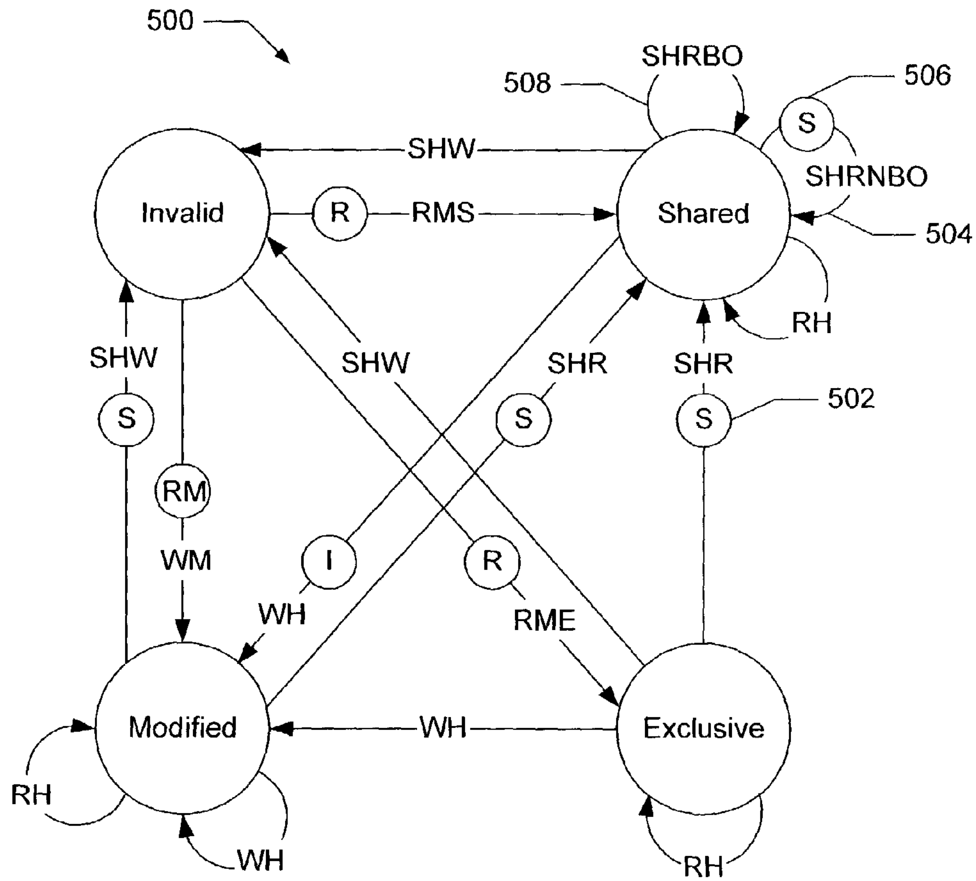
FIG. 4 is a state diagram of a MESI cache coherency protocol amended to include "exclusive" intervention and "shared" intervention.

A state diagram 500 of a MESI cache coherency protocol amended to include "exclusive" intervention and "shared" intervention is illustrated in FIG. 4. In addition to the state transitions normally associated with the well known MESI cache coherency protocol, two transitions are modified and one transition is added.

First, a "snoop push" operation 502 is added to the "exclusive-to-shared" transition associated with a "snoop hit on read." A "snoop push" operation is a cache operation in which a first cache supplies a memory block to a second cache instead of a main memory supplying the second cache. A cache following this amended protocol will intervene to supply an "exclusive" block to a requesting cache and change the state of the supplied block to "shared."

Second, a "shared-to-shared" transition 504 associated with a "snoop hit on read with no back-off" is added, and this new transition includes a "snoop push" operation 506. A cache following this amended protocol will intervene to supply a "shared" block to a requesting cache without changing the state of the supplied block. This protocol could be followed, for example, by the cache that wins the arbitration in a shared block situation.

Third, the "shared-to-shared" transition 508 normally associated with a "snoop hit on read" is modified to additionally check if a "back-off" signal is asserted. There is no "snoop push" associated with this transition. Accordingly, a cache with a shared block that is told to "back-off," will not place traffic on the cache interconnect 204. This modification to the standard MESI protocol allows another cache that does not receive a "back-off" signal to intervene in accordance with the new SHRNBO transition 504 without contention on the cache interconnect 204. Of course, a person of ordinary skill in the art will readily appreciate that other arbitration schemes may be similarly employed.

Figure 5:
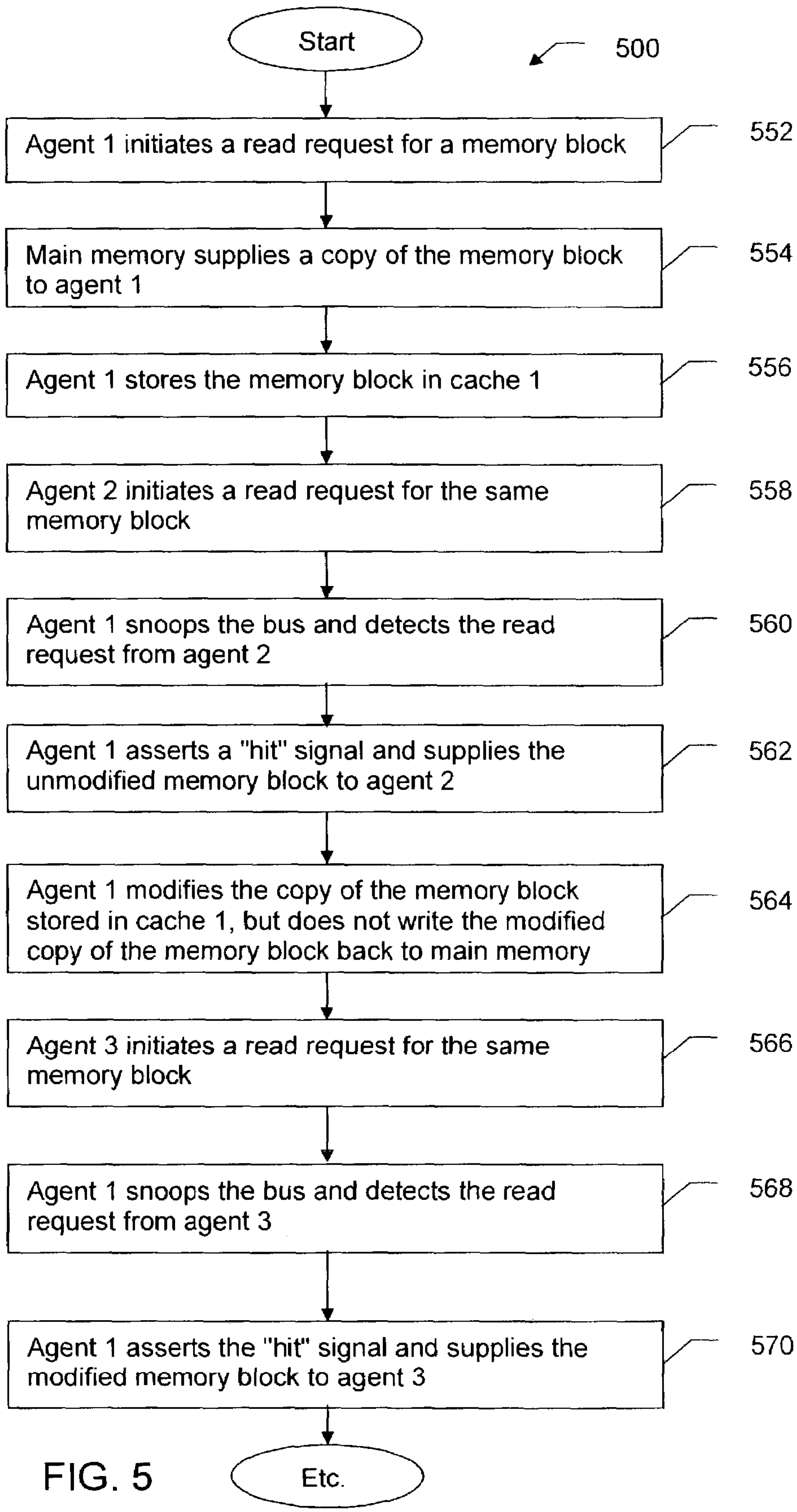
FIG. 5 is a flowchart of another process for cache intervention.

A flowchart of another process 550 for cache intervention is illustrated in FIG. 5. Although the process 550 is described with reference to the flowchart illustrated in FIG. 5, a person of ordinary skill in the art will readily appreciate that many other methods of performing the acts associated with process 550 may be used. For example, the order of some of the operations may be changed In addition, many of the operations described are optional, and many additional operations may occur between the operations illustrated.

Generally, the process 550 provides cache intervention regardless of the modified/unmodified state of the cached memory block. As a result, a single "hit" line (as opposed to a "hit" line and a "modified hit" line) may be used. The process 550 begins when a first caching agent 200 initiates a read request for a memory block (operation 552). For example, a CPU 206 in a multi-processor system 104 may place an address on an address bus 204 and assert a read signal line. If no caching agent 200 is currently storing the requested memory block (e.g., no caching agent asserts the "hit out" signal line), main memory 108 supplies a copy of the requested memory block to the first agent 200 (operation 554). After receiving the requested memory block from main memory 108, the first caching agent 200 stores the memory block in its local cache 208 (operation 556).

Subsequently, a second caching agent 200 may initiate a read request for the same memory block (operation 558). Preferably, the first agent 200 detects the read request from the second agent by monitoring the address bus for the address associated with the memory block (i.e., "snooping" the bus) (operation 560). When the first agent 200 detects the read request form the second agent, the first agent 200 asserts its "hit out" signal line, and supplies the unmodified memory block to the second agent (operation 562).

Subsequently, the first caching agent 200 may modify the copy of the memory block stored in its local cache 208 (operation 564). However, if the first caching agent 200 does not write the modified copy of the memory block back to main memory 108, the memory block is "dirty" (i.e., the cached copy is different than the main memory copy).

Subsequently, a third caching agent 200 may initiate a read request for the same memory block (operation 566). Preferably, the first agent 200 detects the read request from the second agent by monitoring the address bus for the address associated with the memory block (i.e., "snooping" the bus) (operation 568). When the first agent 200 detects the read request form the second agent, the first agent 200 asserts its "hit out" signal line, and supplies the modified memory block to the third agent (operation 570).

In summary, persons of ordinary skill in the art will readily appreciate that methods and apparatus for cache intervention has been provided. Systems implementing the teachings described herein may benefit from a reduction in memory latency, bus traffic, and power consumption.

The foregoing description has been presented for the purposes of illustration and description. It is not intended to be exhaustive or to limit the invention to the examples disclosed. Many modifications and variations are possible in light of the above teachings. It is intended that the present application be limited not by this detailed description of examples, but rather by the claims appended hereto.

What is claimed is:

1. A method comprising:

snooping a cache interconnect to detect a memory read request associated with a cached memory block cached in a first cache and cached in a second cache;

asserting a first signal line indicative of a cache hit in response to snooping the cache interconnect if the cached memory block is in the first cache in an unmodified state;

asserting a second signal line indicative of a cache hit in response to snooping the cache interconnect if the cached memory block is in the second cache in an unmodified state; and upon a cache hit to the first and second caches, supplying the cached memory block from the first cache or the second cache to a third cache based on a predetermined arbitration hierarchy, wherein the first cache, the second cache, and the cache interconnect are located in a single device and the single device is a multi-processor system.

2. A method as defined in claim 1 wherein the cache interconnect comprises a bus, one or more dedicated lines, or a crossbar.

3. A method as defined in claim 1 wherein the first cache is located in a first chip and the second cache is located in a second chip.

4. A method comprising:

snooping a cache interconnect to detect a memory read request associated with a cached memory block cached in a first cache and cached in a second cache;

asserting a first signal line indicative of a cache hit in response to snooping the cache interconnect if the cached memory block is in the first cache in an unmodified state;

asserting the first signal line indicative of a cache hit in response to snooping the cache interconnect if the cached memory block is in the first cache in a modified state;

asserting a second signal line indicative of a cache hit in response to snooping the cache interconnect if the cached memory block is in the second cache in an unmodified state;

asserting the second signal line indicative of a cache hit in response to snooping the cache interconnect if the cached memory block is in the second cache in a modified state;

upon a cache hit to the first and second caches, supplying the cached memory block from the first cache or the second cache to a third cache based on a predetermined arbitration hierarchy.

5. An apparatus comprising:

a first caching agent;

a cache interconnect coupled to the first caching agent;

a second caching agent coupled to the cache interconnect, the second caching agent to monitor the cache interconnect to detect a memory read request from the first caching agent, the memory read request being associated with a memory block, the second caching agent to assert a signal line indicative of a cache hit if the memory block is associated with the second caching agent in an unmodified state; and a third caching agent coupled to the cache interconnect, the third caching agent to monitor the cache interconnect to detect a memory read request from the first caching agent, the third caching agent to assert a signal line indicative of a cache hit if the memory block is associated with the third caching agent in an unmodified state, upon a cache hit to the second caching agent and the third caching agent, one of the second caching agent or the third caching agent to supply the memory block to the first caching agent based on a predetermined arbitration hierarchy.

6. An apparatus as defined in claim 5 wherein the second caching agent is to assert a signal line indicative of a cache hit if the memory block is in a modified state, and the third caching agent is to assert a signal line indicative of a cache hit if the memory block is in a modified state.

7. An apparatus as defined in claim 5 wherein the first caching agent, the second caching agent, the third caching agent, and the cache interconnect are located in a single device.

8. An apparatus as defined in claim 7 wherein the single device includes a plurality of central processing units.

9. An apparatus as defined in claim 7 further comprising:

a memory controller coupled to the cache interconnect; and a main memory coupled to the memory controller by a system interconnect, wherein the main memory is located in a second device separate from the single device.

10. An apparatus as defined in claim 5 wherein the cache interconnect comprises a bus, one or more dedicated lines, or a crossbar.

11. An apparatus as defined in claim 5 wherein the first caching agent comprises a first central processing unit and a first cache, the second caching agent comprises a second central processing unit and a second cache, and the third caching agent comprises a third central processing unit and a third cache.

12. An apparatus as defined in claim 11 wherein at least one of the first cache, the second cache and the third cache includes at least two caches.

13. An apparatus as defined in claim 5 wherein each of the first, second and third caching agents includes a hit in line, the signal lines indicative of a cache hit are logically ORed together by one or more OR gates, and an output of the one or more OR gates is input to each of the hit in lines.

14. An apparatus as defined in claim 5 wherein the first caching agent is located in a first device, the second caching agent is located in a second device, and the third caching agent is located in a third device.

15. An apparatus as defined in claim 5, wherein the apparatus does not include a signal line to indicate a hit-modified caching agent response.

16. An apparatus as defined in claim 5 wherein the first, second and third caching agents substantially follow a MESI, MOESI, ESI, Berkely or Illinois cache coherency protocol.

17. A method comprising:

snooping a cache interconnect to detect a memory read request associated with a cached memory block cached in a first cache and cached in a second cache;

asserting a first signal line indicative of a cache hit in response to snooping the cache interconnect if the cached memory block is in the first cache in an unmodified state;

asserting a second signal line indicative of a cache hit in response to snooping the cache interconnect if the cached memory block is in the second cache in an unmodified state; and upon a cache hit to the first and second caches, supplying the cached memory block from the first cache or the second cache to a third cache based on a predetermined arbitration hierarchy, wherein the first cache is associated with a first central processing unit and the second cache is associated with a second central processing unit.

18. A method as defined in claim 17 wherein the first cache, the second cache, and the cache interconnect are located in a single device.

19. A method as defined in claim 17 wherein at least one of the first cache and the second cache includes at least two caches.

20. A system comprising:

a memory controller;

a SDRAM;

a system interconnect coupling the memory controller and the SDRAM; and a multi-processor system coupled to the memory controller and including:

a first caching agent;

a cache interconnect coupled to the first caching agent;

a second caching agent coupled to the cache interconnect, the second caching agent to monitor the cache interconnect to detect a memory read request from the first caching agent, the memory read request being associated with a memory block, the second caching agent to assert a signal line indicative of a cache hit if the memory block is associated with the second caching agent in an unmodified state; and a third caching agent coupled to the cache interconnect, the third caching agent to monitor the cache interconnect to detect a memory read request from the first caching agent, the third caching agent to assert a signal line indicative of a cache hit if the memory block is associated with the third caching agent in an unmodified state, upon a cache hit to the second caching agent and the third caching agent, one of the second caching agent or the third caching agent to supply the memory block to the first caching agent based on a predetermined arbitration hierarchy.

21. A system as defined in claim 20 wherein the second caching agent is to assert a signal line indicative of a cache hit if the memory block is in a modified state, and the third caching agent is to assert a signal line indicative of a cache hit if the memory block is in a modified state.

22. An apparatus as defined in claim 20 wherein the multi-processor system is a single device.

23. An apparatus as defined in claim 20 wherein the cache interconnect comprises a bus, one or more dedicated lines, or a crossbar.

24. An apparatus as defined in claim 20 wherein the first caching agent comprises a first central processing unit and a first cache, the second caching agent comprises a second central processing unit and a second cache, and the third caching agent comprises a third central processing unit and a third cache.

* * * * *